United States Patent
Lynn et al.

(10) Patent No.: US 10,924,186 B1
(45) Date of Patent: Feb. 16, 2021

(54) OPTICAL FIBER LINK FOR REMOTE LOW POWER SENSOR SOLUTION

(71) Applicant: NETGAMI SYSTEM L.L.C., Short Hills, NJ (US)

(72) Inventors: John Lynn, Easton, PA (US); Eric Lynn, Easton, PA (US)

(73) Assignee: NETGAMI SYSTEM L.L.C., Short Hills, NJ (US)

( * ) Notice: Subject to any disclaimer, the term of this patent is extended or adjusted under 35 U.S.C. 154(b) by 0 days.

(21) Appl. No.: 16/701,475

(22) Filed: Dec. 3, 2019

(51) Int. Cl.
| H04B 10/00 | (2013.01) |
| H04B 10/25 | (2013.01) |
| G02B 6/42 | (2006.01) |
| H04B 10/80 | (2013.01) |
| H04B 10/69 | (2013.01) |
| H04B 10/50 | (2013.01) |

(52) U.S. Cl.
CPC ..... *H04B 10/25891* (2020.05); *G02B 6/4206* (2013.01); *H04B 10/2589* (2020.05); *H04B 10/503* (2013.01); *H04B 10/69* (2013.01); *H04B 10/80* (2013.01)

(58) Field of Classification Search
CPC .......... H04B 10/25891; H04B 10/2589; H04B 10/503; H04B 10/69; H04B 10/80; H04B 10/40; H04B 10/1143; H04B 3/54; H04B 10/807; H04B 1/38; G02B 6/4206; G02B 6/4246; G02B 26/0833; G02B 27/126; G02B 27/14; G02B 26/02; G02B 26/0841; G02B 26/085; G02B 6/29368; G02B 6/2938; G02B 6/322; G02B 6/3518; G02B 6/3512; G02B 6/266; G02B 6/32; G02B 6/352; G02B 6/3546; G02B 6/3516; G02B 6/3556; G02B 6/3586; H04J 14/06; H04J 14/0272; H04J 14/0212; H04J 14/02; H04Q 2011/0009
USPC .................................. 398/106, 107, 135–139
See application file for complete search history.

(56) References Cited

U.S. PATENT DOCUMENTS

| 6,396,976 B1 * | 5/2002 | Little | G02B 6/357 385/17 |
| 6,590,697 B2 * | 7/2003 | Vaganov | G02B 6/266 359/290 |
| 6,610,974 B1 * | 8/2003 | Hunt | G02B 6/3564 250/227.14 |

(Continued)

*Primary Examiner* — Hibret A Woldekidan
(74) *Attorney, Agent, or Firm* — Birch, Stewart, Kolasch & Birch, LLP

(57) ABSTRACT

An optical fiber link includes a local host control device including a microcontroller unit transmitting a host transmitting signal, and an electrical-to-optical converter converting the host transmitting signal to a laser beam optical signal; a remote sensor device including a sensor device transmitting a sensor transmitting signal and an optical return module selectively passing or blocking part of the laser beam optical signal; and a fiber cable including an upstream fiber link and a downstream fiber link and establishing communications between the local host control device and the remote sensor device, the laser beam optical signal being delivered from the local host control device to the remote sensor device through the downstream fiber link. The optical return module selectively passes or blocks the part of the laser beam optical signal delivered by the downstream fiber link based on the sensor transmitting signal to the upstream fiber link.

13 Claims, 9 Drawing Sheets

(56) References Cited

U.S. PATENT DOCUMENTS

| | | | | |
|---|---|---|---|---|
| 7,315,673 | B2* | 1/2008 | Hata | G02B 6/29368 |
| | | | | 385/16 |
| 8,200,094 | B1* | 6/2012 | Zhovnirovsky | H04B 10/803 |
| | | | | 398/129 |
| 2009/0030278 | A1* | 1/2009 | Minakuchi | A61B 1/128 |
| | | | | 600/118 |
| 2012/0294615 | A1* | 11/2012 | Xu | H04J 14/0282 |
| | | | | 398/68 |
| 2016/0072586 | A1* | 3/2016 | Hochberg | H04B 10/64 |
| | | | | 398/136 |
| 2017/0142504 | A1* | 5/2017 | Hochberg | H04J 14/06 |
| 2018/0248630 | A1* | 8/2018 | Heimbuch | G02B 6/4246 |
| 2018/0269991 | A1* | 9/2018 | Chaffee | H04B 10/807 |
| 2018/0331779 | A1* | 11/2018 | Marcoccia | H04J 14/0272 |

* cited by examiner

OPTICAL FIBER LINK FOR REMOTE LOW POWER SENSOR SOLUTION

BACKGROUND OF THE INVENTION

1. Field of the Invention

The present invention relates to an optical fiber link, particularly to an optical fiber link which provides an optical link with bidirectional half-duplex or the unidirectional communication channel with very little power for the remote sensor. The present invention can also supply the power to remote sensor(s) by the power-over-fiber. The optical fiber link could reach up to several kilometers with multi-mode fiber or tens of kilometers with single-mode fiber.

2. Background of the Invention

An optical link for a remote sensor optical communication could include local host control devices, fiber links, functional blocks, and the remote sensor devices. FIG. 1 illustrates a conventional remote sensor optical communication links solution. The local host control device 10 communicates with remote sensor device 12 through the fiber cable 11. Normally, the Microcontroller Unit (MCU) 101 generates the control or communication data and converts it to the host transmitting (HTX) 102 signals, HIGH or LOW, and sends the HTX 102 signals to the electrical-to-optical (E/O) converter 103 which converts the HTX 102 signals to the laser beam optical signals. When the HTX is in HIGH state, the laser beam will be turned on or in high power state. When the HTX is in LOW state, the laser beam will be turned off or in low power state. The laser beam optical signals are carried by the downstream fiber link 111 to the optical-to-electrical (O/E) converter 124 of the remote sensor devices 12 which converts the laser beam's high and low power states to the sensor receiving (SRX) 125 signals, HIGH or LOW state, then sends the SRX 125 signal to the sensor device 121. The sensor device 121 sends the sensor transmitting (STX) 122 signals, HIGH or LOW state, to the E/O converter 123 which converts the STX 122 signals to laser beam high power and low power optical signals. The laser beam optical signals are carried by the upstream fiber link 112 to O/E converter 104 of the local host control device 10 which converts the laser beam optical signal to the host receiving (HRX) 105 signals, HIGH or LOW state. This signal is then received by the MCU 101. The MCU calculates and recovers the STX signals 122 from the sensor device 121. Normally, the O/E converters 104 and 124 require the minimum laser beam power to prevent the O/E converters from loss of signal state when the laser beam is in LOW state and keep the O/E converters in good working condition.

In general, the O/E and E/O converters consume a lot of power. Normally, the remote sensor only has very limited power resource. Due to limited power resource on the remote sensor device side, providing enough power to the O/E and E/O converters on the remote sensor side is difficult. It is almost impossible to use only the fiber cable links for the communication between host control device and remote low power sensor device.

For the remote low power sensor applications, the communication data rate could be very low. It could be from in several bits per second to thousands of bits per second. Thus, reducing the power consumption of the O/E 124 and E/O 123 converters on the remote low power sensor device 12 is necessary in order to use the fiber cable links 11 for remote low power sensor device 12.

SUMMARY OF THE INVENTION

Accordingly, it is an objective of the present invention to provide an optical fiber link for remote low power solution with bidirectional half-duplex or the unidirectional communication channel with very little power for the remote sensor. It is also an objective of the present invention to provide an optical fiber link for remote low power solution while supplying power to remote sensor(s) by the power-over-fiber.

In order to achieve the above objectives, the present invention uses solar cell to replace the O/E converter on the downstream fiber link. The solar cell does not consume power but generate power which can be used for the remote low power sensor device. The remote lower power sensor device can also recover the laser beam optical signal states by detecting the solar cell's voltage and/or changes in current. On the upstream fiber link, the present invention uses a portion of the downstream laser beam optical signals that are split from the downstream fiber by the optical splitter as the laser beam source and controls the laser beam to pass, or turn on, the laser beam to upstream fiber link, or block or turn off, to allow a very low portion of the laser beam to reach the upstream fiber link. The turn-on and turn-off the laser beam states replace the E/O converter operation for the upstream fiber communication link. The pass and block states can be controlled by mechanical, electrical, piezoelectric, or magnetic force generated by the sensor device.

In particular, according to a first aspect of the present invention, an optical fiber link comprises: a local host control device including a microcontroller unit configured to transmit a host transmitting signal, an electrical-to-optical converter configured to convert the host transmitting signal to a laser beam optical signal, and an optical-to-electrical converter configured to convert a laser beam optical signal to a host receiving signal; a remote sensor device including a sensor device configured to transmit a sensor transmitting signal and an optical return module configured to selectively pass or block at least part of the laser beam optical signal; and a fiber cable including an upstream fiber link and a downstream fiber link and configured to establish communications between the local host control device and the remote sensor device, the laser beam optical signal being delivered from the local host control device to the remote sensor device through the downstream fiber link, wherein the optical return module is configured to selectively pass or block the at least part of the laser beam optical signal delivered by the downstream fiber link based on the sensor transmitting signal, to the upstream fiber link.

According to a second aspect of the present invention, the above-mentioned optical return module comprises an optical valve mechanism configured to selectively pass or block the at least part of the laser beam optical signal to the upstream fiber link.

According to a third aspect of the present invention, the above-mentioned optical valve mechanism includes a lens and a lens controller configured to control the lens to selectively pass or block the at least part of the laser beam optical signal to the upstream fiber link by changing a focus of the lens based on a power state of the sensor transmitting signal.

According to a fourth aspect of the present invention, the above-mentioned optical valve mechanism includes a mirror and a mirror controller configured to control the mirror to selectively pass or block the at least part of the laser beam optical signal to the upstream fiber link by changing a tilting angle of the mirror based on a power state of the sensor transmitting signal.

According to a fifth aspect of the present invention, the above-mentioned optical valve mechanism includes a magnetic or metal blocker, a control magnet, and a blocker controller configured to use the physical force to control the magnet to move the magnetic or metal blocker to selectively pass or block the at least part of the laser beam optical signal to upstream fiber link by moving the control magnet based on a power state of the transmitting signal.

According to a sixth aspect of the present invention, the above-mentioned optical valve mechanism includes a magnetic coil driver, a magnetic coil, and a magnetic or metal blocker configured to control the magnetic or metal blocker to selectively pass or block the at least part of the laser beam optical signal to upstream fiber link by changing the magnetic force of the magnetic coil based on a power state of the transmitting signal.

According to a seventh aspect of the present invention, the above-mentioned optical return module further comprises: an optical splitter configured to split the at least part of the laser beam optical signal into a first optical path leading to the optical valve mechanism and a second optical path leading to an optical combiner; and the optical combiner configured to combine an output of the optical valve mechanism and a laser beam optical signal passing the second optical path, and output the combined laser beam optical signal to the upstream fiber link.

According to an eighth aspect of the present invention, a laser beam power ratio of a laser beam optical signal passing the first optical path to a laser beam optical signal passing the second optical path is between 9:1 and 5:5.

According to a ninth aspect of the present invention, the above-mentioned remote sensor device further comprises an optical splitter configured to split the laser beam optical signal delivered by the downstream fiber link into a first optical path leading to the sensor device, and a second optical path leading to the optical return module.

According to a tenth aspect of the present invention, a laser beam power ratio of a laser beam optical signal passing the first optical path leading to the sensor device to a laser beam optical signal passing the second optical path leading to the optical return module is between 9:1 and 2:8.

According to an eleventh aspect of the present invention, the above-mentioned remote sensor device further comprises a solar cell configured to absorb and convert a laser beam optical signal delivered by the first optical path into an electrical energy for supplying power to the sensor device.

According to a twelfth aspect of the present invention, the above-mentioned remote sensor device further comprises a signal detector detecting a voltage and/or current change of the electrical energy output from the solar cell and converting the electrical energy output from the solar cell to a sensor receiving signal to be delivered to the sensor device.

According to an thirteenth aspect of the present invention, the above-mentioned remote sensor device further comprises a solar cell configured to absorb and convert a laser beam optical signal delivered by the first optical path into an electrical energy; and a signal detector receiving the electrical energy from the solar cell, detecting a voltage and/or current change of the electrical energy and converting the electrical energy to a sensor receiving signal to be delivered to the sensor device.

According to a fourteenth aspect of the present invention, the optical return module is configured to selectively pass or block the whole laser beam optical signal.

According to a fifteenth aspect of the present invention, a method of establishing a communication link between a local host control device and a remote sensor device, comprises of the following steps: connecting the local host control device and the remote sensor device with a fiber cable including an upstream fiber link and a downstream fiber link; transmitting a host transmitting signal from a microcontroller unit of the local host control device; converting the host transmitting signal to a laser beam optical signal; transmitting the laser beam optical signal from the local host control device to the remote sensor device through the downstream fiber link; selectively passing or blocking at least part of the laser beam optical signal delivered by the downstream fiber link, based on a sensor transmitting signal transmitted by a sensor device of the remote sensor device, to the upstream fiber link, wherein a laser beam optical signal delivered to the upstream fiber link is in a high laser beam power state when sensor transmitting signal is in a high voltage level, and is in a low laser beam power state when sensor transmitting signal is in a low voltage level.

According to a sixteenth aspect of the present invention, the above-mentioned method further comprises the step of splitting the laser beam optical signal delivered by the downstream fiber link from the local host into a first optical path for supplying power to the sensor device with a solar cell, and a second optical path as said at least part of the laser beam optical signal for delivering to the upstream fiber link.

According to a seventeenth aspect of the present invention, a laser beam power ratio of a laser beam optical signal passing the first optical path to a laser beam optical signal passing the second optical path in the above-mentioned method is between 9:1 and 2:8.

According to an eighteenth aspect of the present invention, the above-mentioned method further comprises the step of recovering laser beam optical signal states by detecting a voltage change of a voltage energy output from the solar cell and converting the voltage energy output from the solar cell to a sensor receiving signal to be delivered to the sensor device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent from this detailed description to those skilled in the art.

BRIEF DESCRIPTION OF THE DRAWINGS

The present invention will become better understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
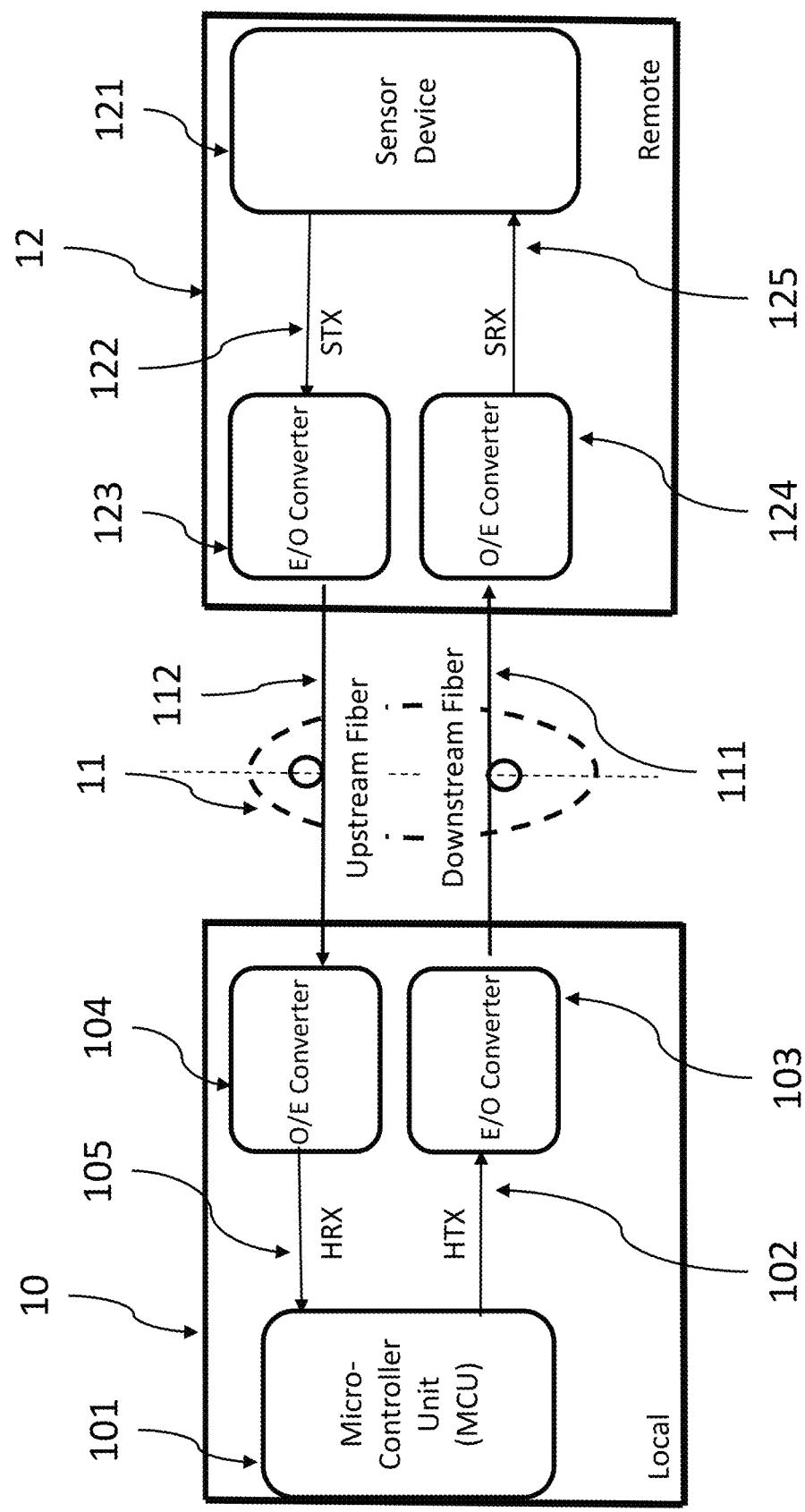
FIG. 1 is a schematic drawing of a conventional remote sensor optical communication links solution.

The present invention will now be described in detail with reference to the accompanying drawings, wherein the same reference numerals will be used to identify the same or similar elements throughout the several views. It should be noted that the drawings should be viewed in the direction of orientation of the reference numerals.

As mentioned above, in order to use the fiber cable links for the remote low power sensor devices, it is necessary to reduce the power consumption of the O/E 124 and E/O 123 converters for the remote low power sensor devices 12 in the conventional remote sensor optical communication links solution as illustrated in FIG. 1.

Figure 2:
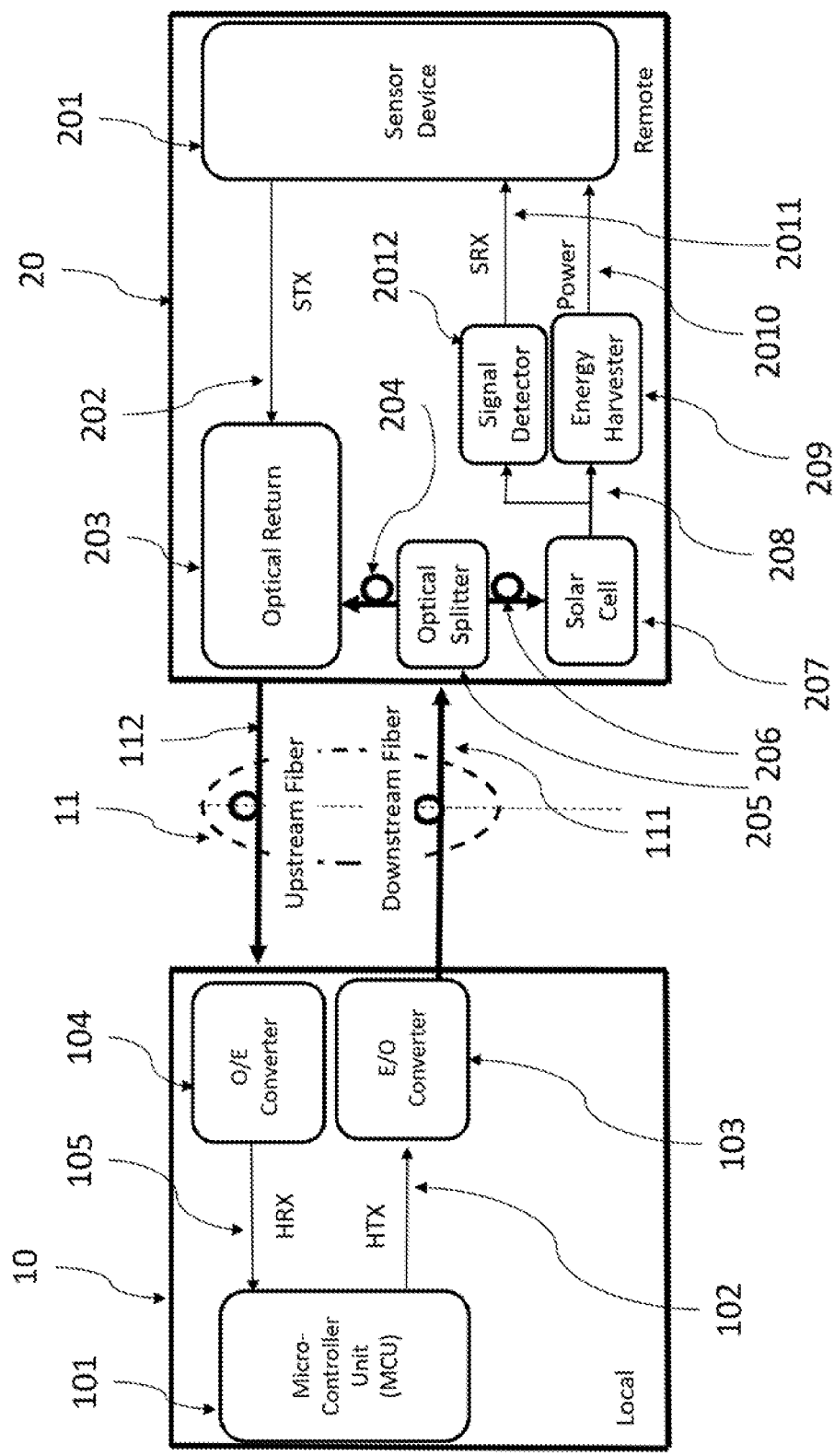
FIG. 2 is a schematic drawing of the optical fiber link for remote low power sensor solution of the present invention.

FIG. 2 illustrates an optical fiber link for remote low power sensor solution in accordance with an embodiment of the present invention. In the illustrated embodiment, the local host control device 10 is similar to that of the conventional remote sensor optical communication links solution as illustrated in FIG. 1. In particular, the local host control device 10 includes an MCU 101, an O/E convertor 104 and an E/O converter 103. The MCU 101 sends the HTX signals 102, HIGH or LOW state, to the E/O converter 103 which converts the HTX signals 102 to the laser beam optical signals. When the HTX signal is in HIGH state, the laser beam will be turned on or in high power state. When the HTX signal is in LOW state, the laser beam will be turned off or in low power state. The laser beam optical signals are carried by the downstream fiber link 111 to the remote sensor device 20. The received laser beam in the downstream fiber 111 is split to two laser beams by the optical splitter 205. One is to the optical path 206 leading to the sensor device 201, and the other is to the optical path 204 leading to the optical return 203. The ratio of the laser beam power to the optical path 206 to the laser beam power to the optical path 204 could be between 9:1 and 2:8, but not limited to the ratios stated. If the sensor device 201 requires power from downstream fiber 111, then the larger portion of the laser beam will be sent to the optical path 206. If the sensor device 201 doesn't need extra power, then a smaller portion of the laser beam will be sent to optical path 206. The ratio is dependent on the power requirements of each optical path. The laser beam on the optical path 206 is absorbed by the solar cell 207 and converted to the low voltage energy 208, normally around 0.5V. The low voltage energy 208 is converted to the regular voltage 2010, normally between 3.3V to 5V, by the energy harvester 209. The regular voltage 2010 could provide the power to the sensor device 201. The signal detector 2012 detects the voltage and/or current changes, due to the HTX signals 102, of the low voltage energy 208 and converts the low voltage energy 208 to the SRX signals 2011 (HIGH or LOW states). The sensor device 201 receives the SRX signals 2011. It completes the downstream communication link from the MCU 101 to the sensor device 201. This above mentioned configuration replaces the O/E converter 124 function in the conventional remote sensor optical communication links solution as illustrated in FIG. 1, and provides the additional power 2010 to the sensor device 201. The optical return 203 is designed to control the laser beam to be passed or blocked from the optical path 204 to the upstream fiber link 112 based on the STX signals 202, HIGH or LOW state. The HIGH state passes the laser beam and the LOW state blocks the laser beam. The O/E converter 104 converts the optical signal from the upstream fiber link 112 to HRX signal then sends the HRX 105 signal to MCU 101 for calculating and recovering to sensor's measuring data. The optical return 203 allows the sensor device 201 to send the STX signals 202 to the upstream fiber link to replace the E/O converter 123 in the conventional remote sensor optical communication links solution as illustrated in FIG. 1, without power to generate the laser beam. The STX signals 202 could be the electrical, mechanical, piezoelectric, magnetic, etc. signals which can generate HIGH and LOW states. Also, the sensor device 201 can send the STX signals 202 to the optical return 203 only when the SRX 2011 is in an active state (HIGH state, normally as high voltage level, around 0.5V of the low voltage energy signal 208). It is also as high laser beam state. When SRX 2011 is in an inactive state (LOW state, normally as low or no laser beam, around 0V of the low voltage level energy signal 208) the sensor device 201 cannot send the STX signals 202 to the optical return 203. The optical return 203 cannot function properly due to very low or no laser beam in the optical path 204, and can only function normally when the high laser beam is in the optical path 204. This kind of communication protocol is also called the half-duplex communication protocol. Only one direction of communication signal, downstream or upstream, can be sent at once.

Figure 3:
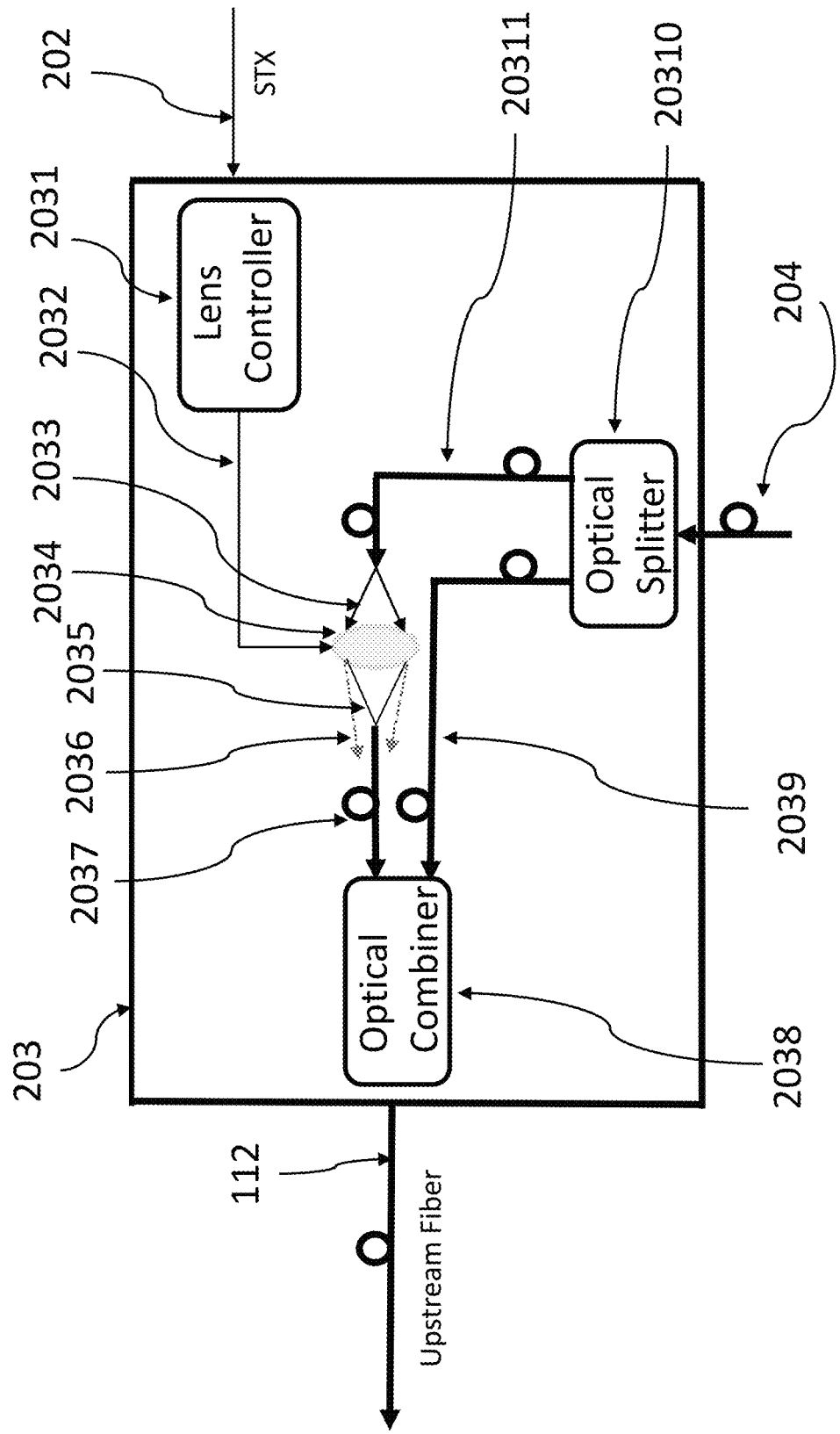
FIG. 3 is a schematic drawing of the functional block of the lens-based optical return design of the present invention.

FIG. 3 illustrates a lens-based optical return design in accordance with an embodiment of the present invention. In the illustrated embodiment, the laser beam of optical path 204 is split to the optical path 2039 and the optical path 20311 by the optical splitter 20310. The optical path 2039 keeps the minimum laser beam power to pass to the upstream fiber link 112 to maintain the minimum laser beam power which will keep the O/E converter 104 in LOW state. This will prevent the O/E converter 104 from a loss of signal state when no light passes to optical path 2037. Normally, the laser beam power ratio of the optical path 2039 and the optical path 20311 is 1:9 to 5:5 for the optical splitter 20310, but not limited to this ratio. The lens 2034 is controlled by the lens controller 2031 to pass or block the laser beam 2033 from the optical path 20311 to the optical path 2037. The lens controller changes the focus of the lens 2034 by a piezoelectric force 2032 state (HIGH or LOW state) which is converted from the STX signal state (HIGH or LOW state). When the STX signal 202 is in HIGH state, the focus of the lens 2034 passes the laser beam 2035 to the optical path 2037. When the STX signal 202 is in LOW state, the focus of the lens 2034 diverges the laser beam 2033 to laser beam 2036 so that very limited laser beam 2036 passes to the optical path 2037. The lens controller 2031 includes a signal processor which converts the LOW state of the STX 202 signal to high voltage on the lens focus control signal 2032 to increase the focus of the lens 2034 so that the lens diverges the laser beam 2033 to the laser beam 2036 to prevent the laser beam 2033 from reaching the optical path 2037, and converts the HIGH state of the STX 202 signal to low or zero voltage on the lens focus control signal 2032 to keep the designed focus of the lens 2034 to focus the laser beam 2033 to laser beam 2035 to reach optical path 2037. The optical combiner 2038 combines the laser beams from both optical paths 2037 and 2039 to the upstream fiber link 112. The laser beam is in HIGH state (high laser beam power) when the STX signal 202 is in HIGH state and the laser beam is in LOW state (low laser beam power) when the STX signal 202 is in LOW state.

Figure 4:
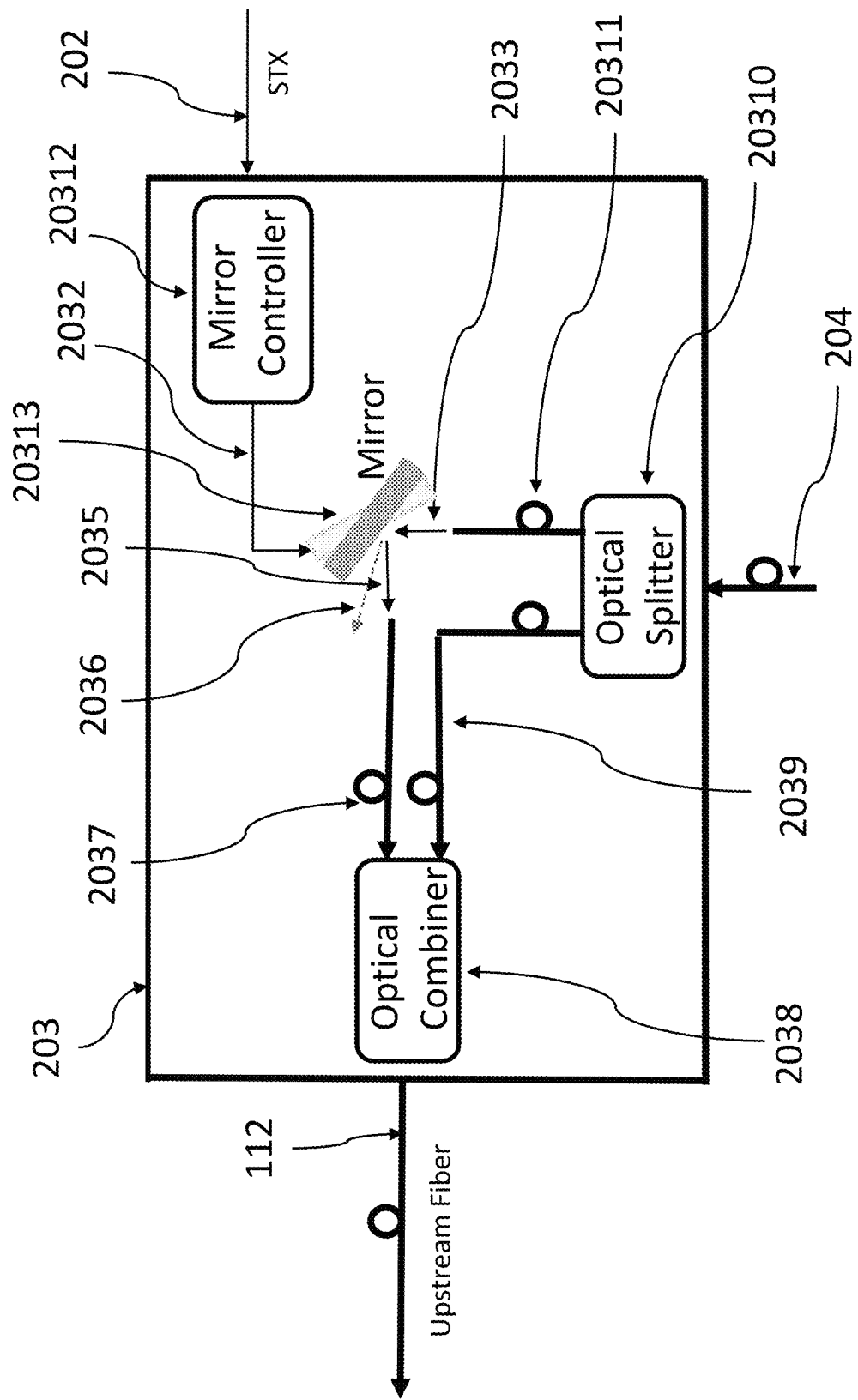
FIG. 4 is a schematic drawing of the functional block of the mirror-based optical return design of the present invention.

FIG. 4 illustrates a mirror-based optical return design in accordance with an embodiment of the present invention. In the illustrated embodiment, the lens 2034 and lens controller 2031 in FIG. 3 are replaced with the mirror 20313 and mirror controller 20312. The mirror controller 20312 controls a tilting angle of the mirror 20313 based on the STX 202 signal state (HIGH or LOW state) by piezoelectric, magnetic, mechanical, or electrical force as tilting force 2032 (HIGH or LOW state). The mirror controller includes a signal processor which converts the LOW state of the STX 202 signal to high voltage on the mirror tilting force 2032 to tilt the mirror 20313 so that the mirror 20313 reflects the laser beam 2033 to 2036, and converts the HIGH state of the STX 202 signal to low or zero voltage on the mirror tilting force 2032 without tilting the mirror 20313 so that the mirror 20313 reflects the laser beam 2033 to 2035. When the tilting force 2032 is in low or zero voltage, the mirror 20131 reflects the laser beam 2033 from the optical path 20311 to the laser beam 2035 to the optical path 2037. When the tilting force 2032 is in high voltage, the mirror 20313 reflects the laser beam 2033 from the optical path 20311 to the laser beam 2036, preventing the laser beam from going to the optical path 2037. The optical combiner 2038 combines the laser beams from both optical paths 2037 and 2039 to the upstream fiber link 112. The laser beam is in HIGH state (high laser beam power) when the STX signal 202 is in HIGH state and in LOW state (low laser beam power) when the STX signal 202 is in LOW state.

Figure 5:
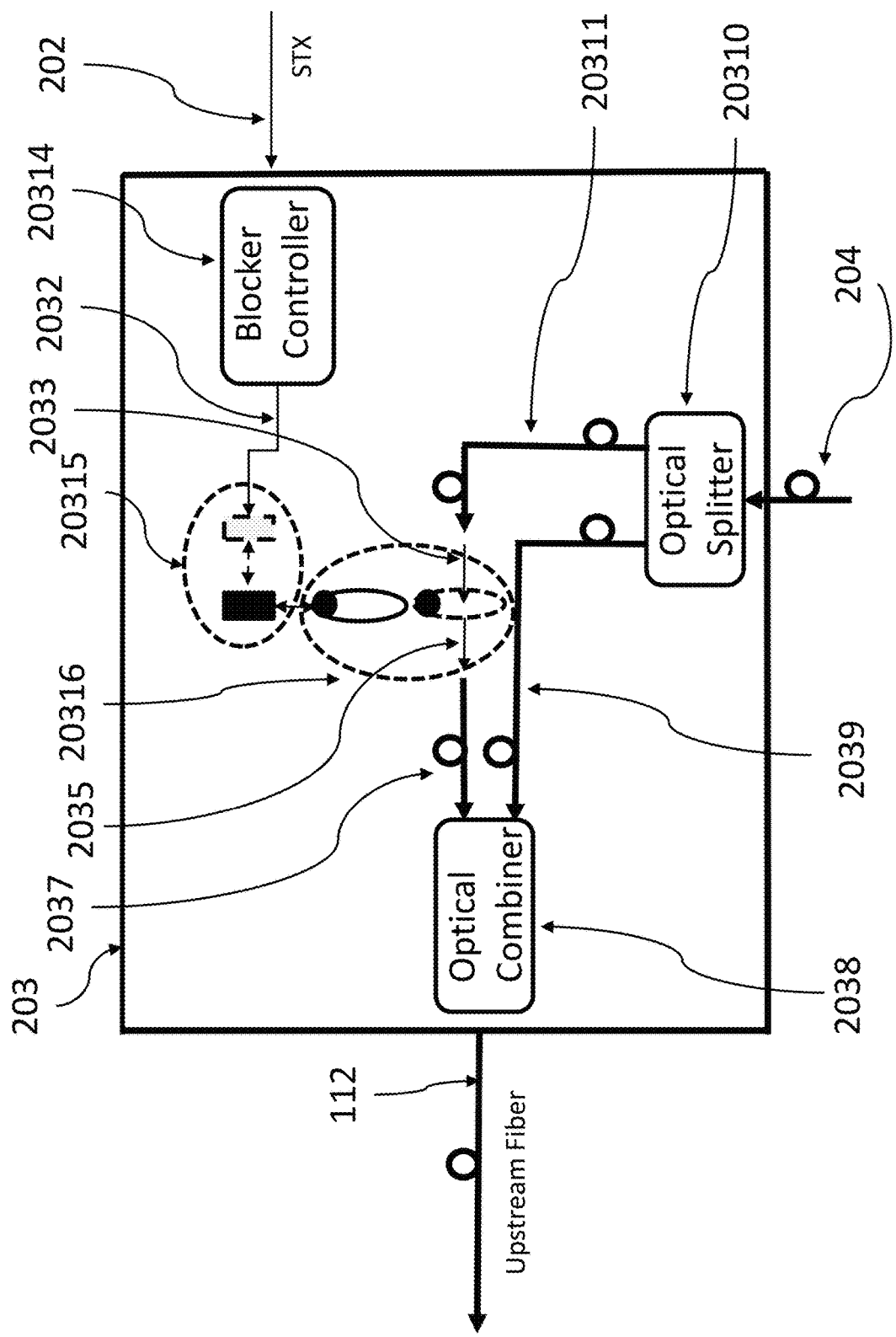
FIG. 5 is a schematic drawing of the functional block of the magnetics blocker-based optical return design of the present invention.

FIG. 5 illustrates a magnetics blocker-based optical return design in accordance with an embodiment of the present invention. In this illustrated embodiment, the lens controller 2031 and lens 2034 in FIG. 3 are replaced with blocker controller 20314, control magnet 20315 and magnetic or metal blocker 20316. The blocker controller 20314 includes a signal processor which converts the STX signal 202 into an actuation force to shift the control magnet 20315 to the HIGH or LOW state. The laser beam 2033 is passed to laser beam 2035 to optical way 2037 when the STX 202 is in HIGH state and the blocker controller 20314 converts the STX HIGH state to the control magnet signal 2032 to shift the control magnet 20315 to align with magnetic or metal blocker 20316. The magnetic force between control magnet 20315 and magnetic or metal blocker 20316 shifts the magnetic or metal blocker 20316 away from the laser beam path. The laser beam 2033 is blocked when the STX 202 is in LOW state and the blocker controller 20314 converts the STX 202 LOW state to the control magnet signal 2032 which moves the control magnet 20315 away from magnetic or metal blocker 20316. The magnetic or metal blocker 20316 blocks the laser beam 2033 from reaching optical way 2037.

Figure 6:
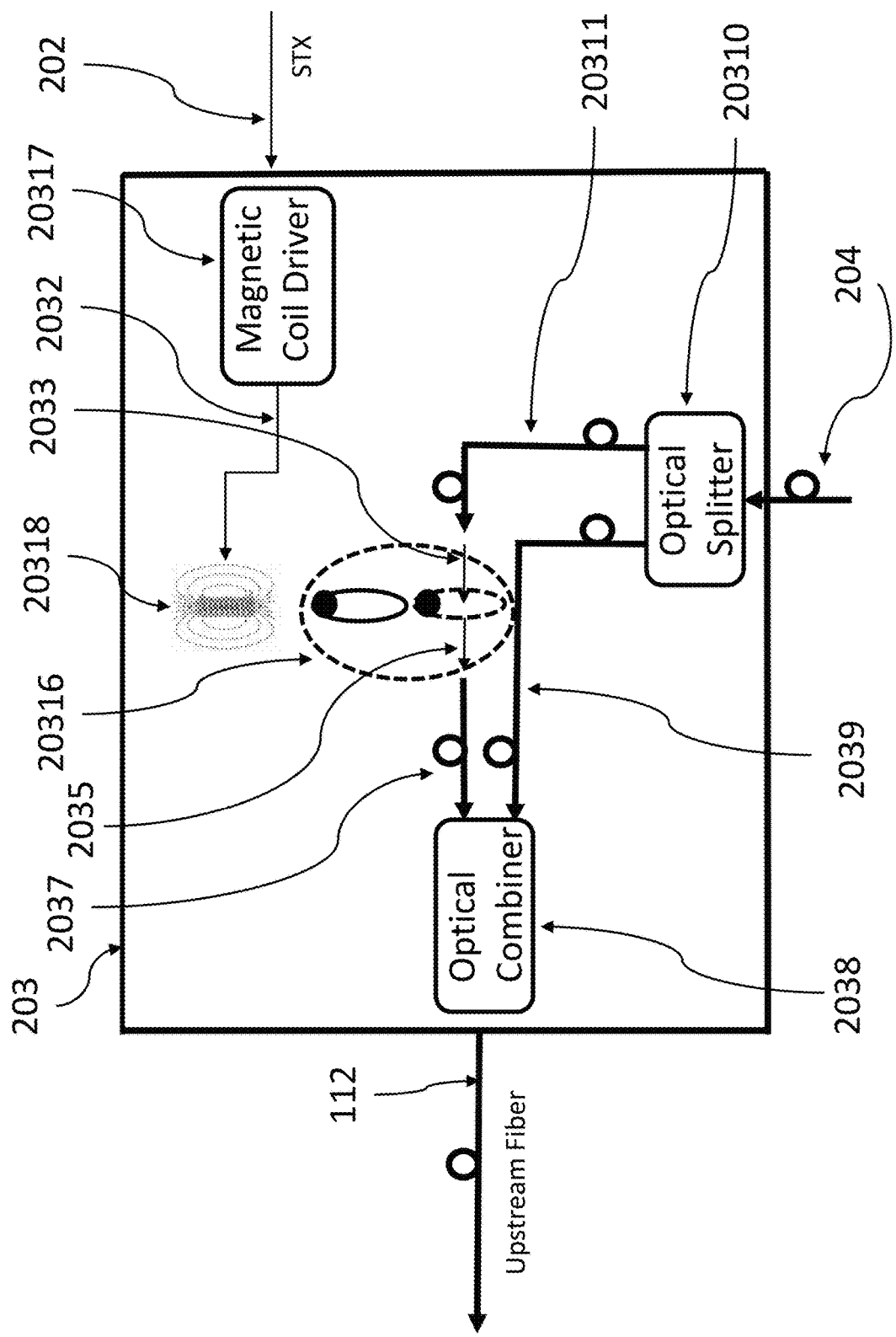
FIG. 6 is a schematic drawing of the functional block of the magnetic coil blocker-based optical return design of the present invention.

FIG. 6 illustrates a magnetic coil blocker-based optical return design in accordance with an embodiment of the present invention. In this illustrated embodiment, the blocker controller 20314 and control magnet 20315 in FIG. 5 are replaced with magnetic coil driver 20317 and magnetic coil 20318. The laser beam 2033 is passed to laser beam coil 2035 to optical way 2037 when the STX 202 is in HIGH state and the magnetic coil driver 20317 enables the current signal 2032 to the magnetic coil 20318 to generate magnetic force to shift the magnetic or metal blocker 20316 away from the laser beam path. The laser beam 2033 is blocked when the STX 202 is in LOW state and the magnetic coil driver 20317 converts the STX 202 LOW state to disable the current signal 2032 to the magnetic coil 20318. The magnetic blocker 20316 blocks the laser beam 2033 to reach optical way 2037.

In the above described optical return designs shown in FIGS. 3-6, the optical splitter 20310 and the optical combiner 2038 are optional. In some embodiments, the optical return 203 does not include the optical splitter 20310 and the optical combiner 2038, and the whole laser beam transmitted from the optical path 204 is selectively passed or blocked on the way to the upstream fiber link 112.

Figure 7:
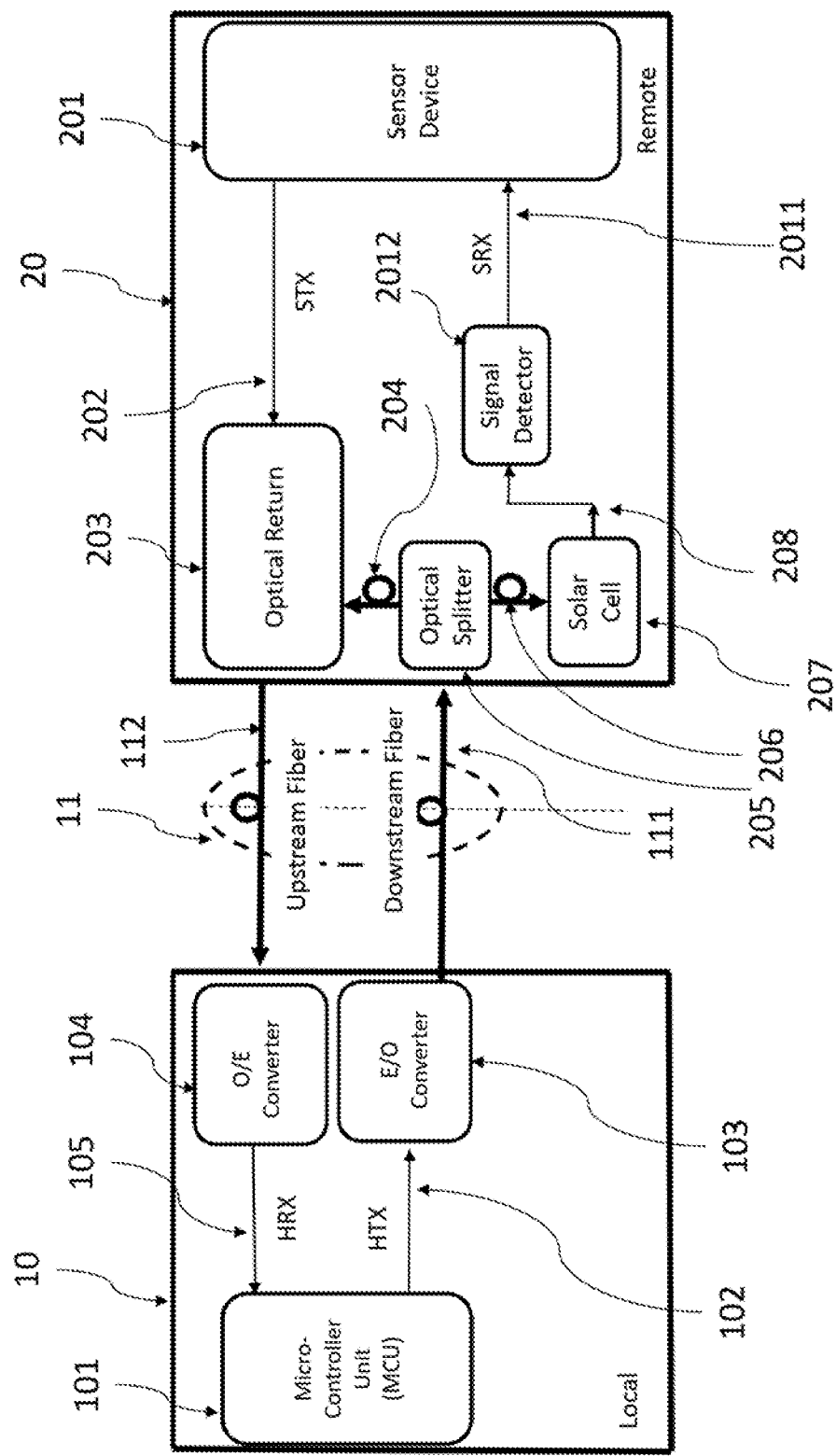
FIG. 7 is schematic drawing of the half-duplex optical fiber communication link without powering the remote sensor device of the present invention.

FIG. 7 illustrates a half-duplex optical fiber communication link in accordance with an embodiment of the present invention. Since some remote sensor devices are self-powered, in this illustrated embodiment, the optical fiber communication link is provided without powering the remote sensor device. In particular, similar to the embodiment illustrated in FIG. 2, the received laser beam in the downstream fiber 111 is split to two laser beams by the optical splitter 205. One is to the optical path 206 leading to the sensor device 201, and the other is to the optical path 204 leading to the optical return 203. The laser beam on the optical path 206 is absorbed by the solar cell 207 and converted to the low voltage energy 208, normally around 0.5V. However, there is no need to provide the power from the local host control device 10 to the remote sensor device 20. Thus, the energy harvest 209 illustrated in FIG. 2 is not needed in this embodiment. The low voltage energy 208 is supplied to the signal detector 2012, so that the signal detector 2012 detects the voltage and/or current changes, due to the HTX signals 102, of the low voltage energy 208 and converts the low voltage energy 208 to the SRX signals 2011 (HIGH or LOW states). The sensor device 201 receives the SRX signals 2011. It completes the downstream communication link from the MCU 101 to the sensor device 201. This will use less power to generate the laser beam optical signal from the E/O converter 103 of the local host control device 10 than in FIG. 2.

Figure 8:
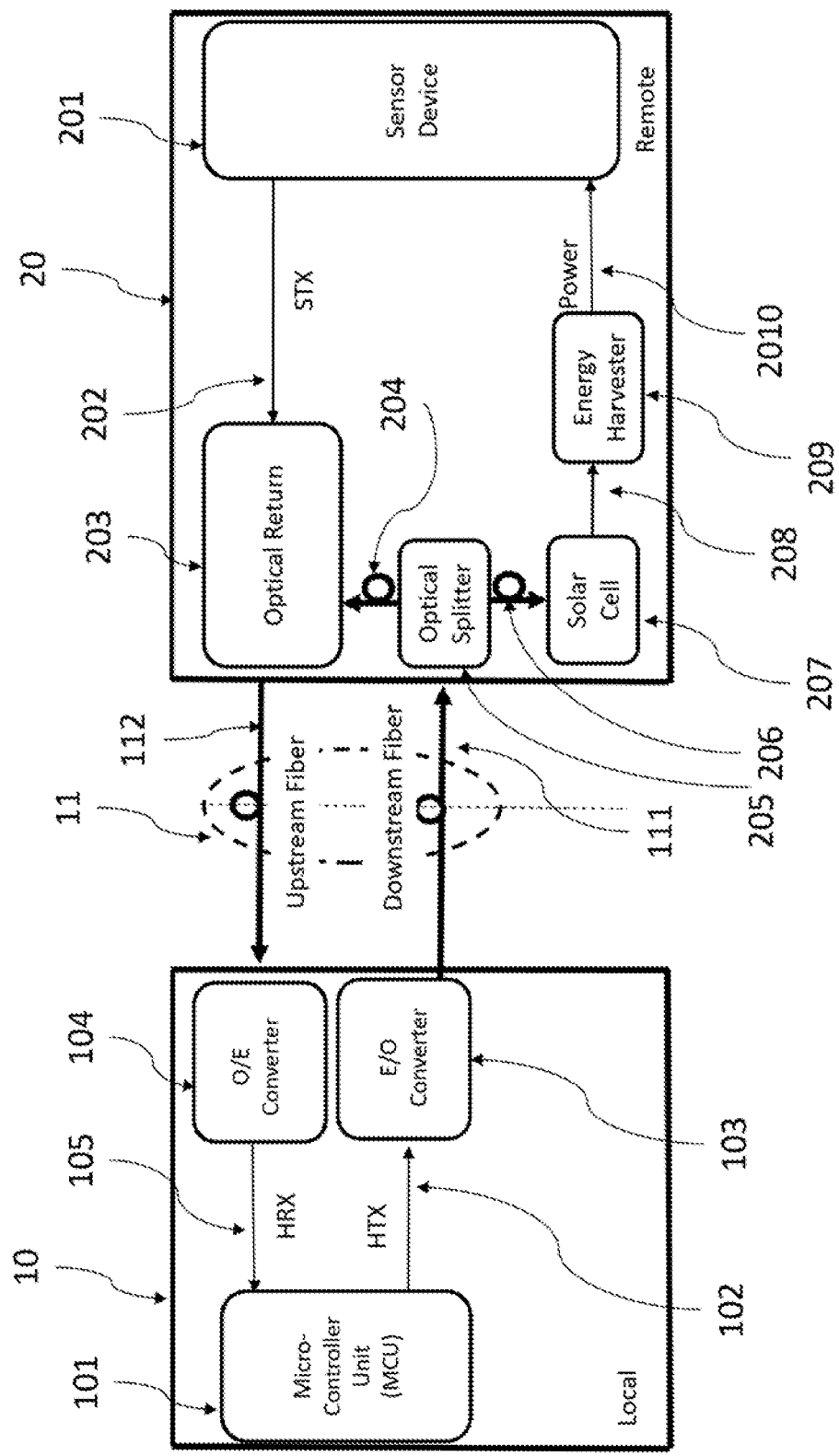
FIG. 8 is schematic drawing of the unidirectional communication link with powering the remote sensor device of the present invention.

FIG. 8 illustrates a unidirectional communication link in accordance with an embodiment of the present invention. Since some remote sensor devices only require unidirectional communication for the upstream fiber link, a signal detector for converting the low voltage energy output from the solar cell into a sensor receiving signal is not needed. The local host controller still provides the power to the remote sensor device. In particular, similar to the embodiment illustrated in FIG. 2, the received laser beam in the downstream fiber 111 is split to two laser beams by the optical splitter 205. One is to the optical path 206 leading to the sensor device 201, and the other is to the optical path 204 leading to the optical return 203. The laser beam on the optical path 206 is absorbed by the solar cell 207 and converted to the low voltage energy 208, normally around 0.5V. The low voltage energy 208 is converted to the regular voltage 2010, normally between 3.3V to 5V, by the energy harvester 209. The regular voltage 2010 could provide the power to the sensor device 201. The signal detector 2012 illustrated in the embodiment of FIG. 2 is not needed, since a downstream communication link from the MCU 101 to the sensor device 201 is not required.

Figure 9:
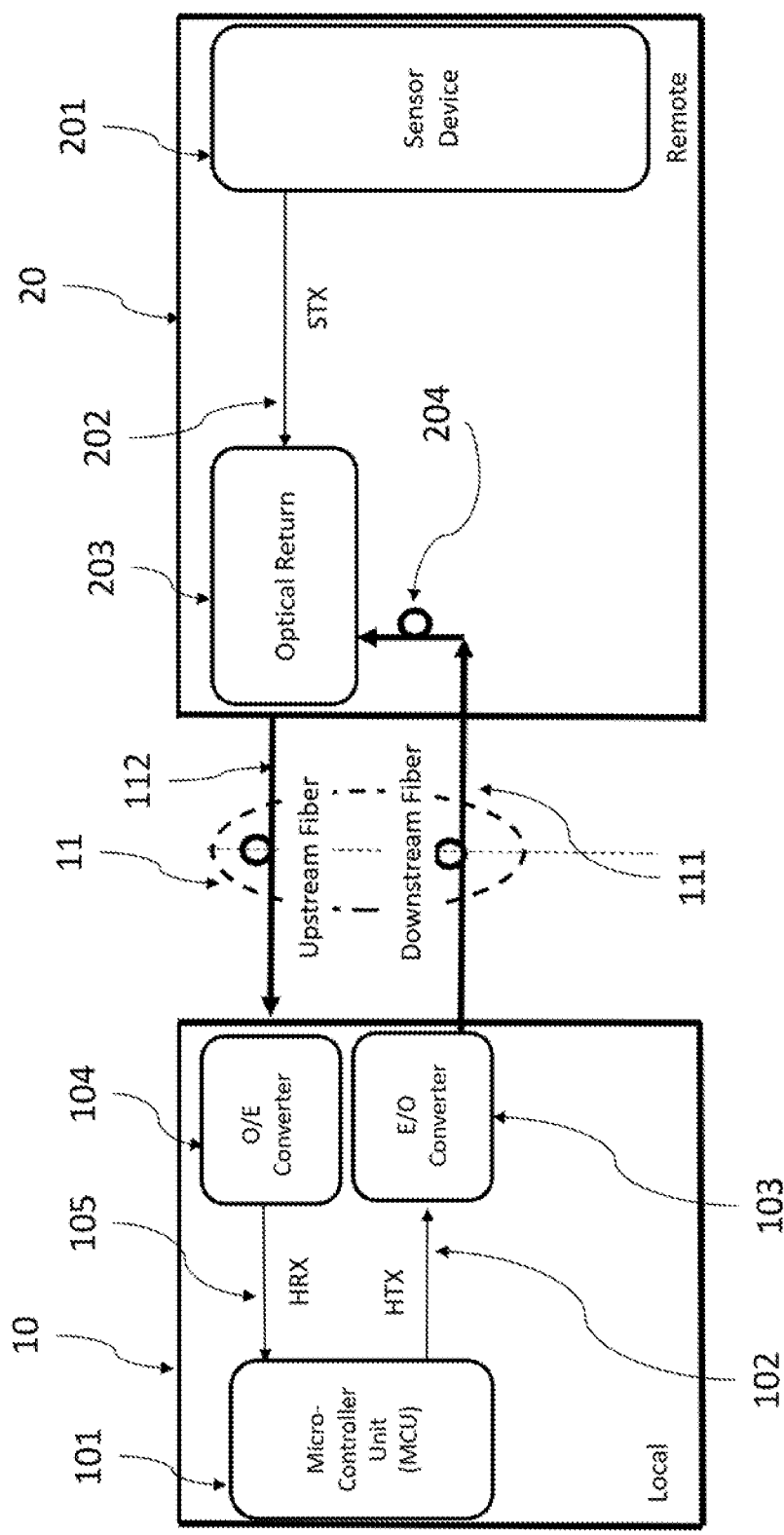
FIG. 9 is schematic drawing of the unidirectional communication link without powering the remote sensor device of the present invention.

FIG. 9 illustrates a unidirectional communication link in accordance with an embodiment of the present invention. Since some remote sensor devices only require unidirectional communication for the upstream fiber link, in this illustrated embodiment, the received laser beam in the downstream fiber 111 is directly linked to optical path 204 which leads to the optical return 203. The optical splitter 205, solar cell 207, energy harvester 209, and signal detector 212 as illustrated in the embodiment of FIG. 2 are not needed. The laser beam from the downstream fiber 112 is linked directly to optical path 204. The optical fiber communication link is also configured without powering the remote sensor device, since some remote sensor devices are self-powered.

The invention being thus described, it will be obvious that the specifics of the present invention may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber link, comprising:
a local host control device including a microcontroller unit configured to transmit a host transmitting signal, and an electrical-to-optical converter configured to convert the host transmitting signal to a laser beam optical signal;
a remote sensor device including a sensor device configured to transmit a sensor transmitting signal and an optical return module configured to selectively pass or block at least part of the laser beam optical signal; and
a fiber cable including an upstream fiber link and a downstream fiber link and configured to establish communications between the local host control device and the remote sensor device, the laser beam optical signal being delivered from the local host control device to the remote sensor device through the downstream fiber link,
wherein the optical return module is configured to selectively pass or block the at least part of the laser beam optical signal delivered by the downstream fiber link based on the sensor transmitting signal, to the upstream fiber link,
wherein the optical return module comprises an optical valve mechanism configured to selectively pass or block the at least part of the laser beam optical signal to the upstream fiber link, and
wherein the optical valve mechanism includes a lens and a lens controller configured to control the lens to selectively pass or block the at least part of the laser beam optical signal to the upstream fiber link by changing a focus of the lens based on a power state of the sensor transmitting signal.

2. The optical fiber link according to claim 1, wherein the optical return module is configured to selectively pass or block the whole laser beam optical signal.

3. An optical fiber link, comprising:
a local host control device including a microcontroller unit configured to transmit a host transmitting signal, and an electrical-to-optical converter configured to convert the host transmitting signal to a laser beam optical signal;
a remote sensor device including a sensor device configured to transmit a sensor transmitting signal and an optical return module configured to selectively pass or block at least part of the laser beam optical signal; and
a fiber cable including an upstream fiber link and a downstream fiber link and configured to establish communications between the local host control device and the remote sensor device, the laser beam optical signal being delivered from the local host control device to the remote sensor device through the downstream fiber link,
wherein the optical return module is configured to selectively pass or block the at least part of the laser beam optical signal delivered by the downstream fiber link based on the sensor transmitting signal, to the upstream fiber link,
wherein the optical return module comprises an optical valve mechanism configured to selectively pass or block the at least part of the laser beam optical signal to the upstream fiber link, and
wherein the optical valve mechanism includes a mirror and a mirror controller configured to control the mirror to selectively pass or block the at least part of the laser beam optical signal to the upstream fiber link by changing a tilting angle of the mirror based on a power state of the sensor transmitting signal.

4. An optical fiber link, comprising:
a local host control device including a microcontroller unit configured to transmit a host transmitting signal, and an electrical-to-optical converter configured to convert the host transmitting signal to a laser beam optical signal;
a remote sensor device including a sensor device configured to transmit a sensor transmitting signal and an optical return module configured to selectively pass or block at least part of the laser beam optical signal; and
a fiber cable including an upstream fiber link and a downstream fiber link and configured to establish communications between the local host control device and the remote sensor device, the laser beam optical signal being delivered from the local host control device to the remote sensor device through the downstream fiber link,
wherein the optical return module is configured to selectively pass or block the at least part of the laser beam optical signal delivered by the downstream fiber link based on the sensor transmitting signal, to the upstream fiber link,
wherein the optical return module comprises an optical valve mechanism configured to selectively pass or block the at least part of the laser beam optical signal to the upstream fiber link, and
wherein the optical valve mechanism includes a control magnet, a magnetic blocker and a blocker controller configured to control the control magnet to selectively pass or block the at least part of the laser beam optical signal to the upstream fiber link by changing a positional relationship between the magnetic blocker and a laser beam path of said at least part of the laser beam optical signal based on a power state of the sensor transmitting signal.

5. An optical fiber link, comprising:
a local host control device including a microcontroller unit configured to transmit a host transmitting signal, and an electrical-to-optical converter configured to convert the host transmitting signal to a laser beam optical signal;

a remote sensor device including a sensor device configured to transmit a sensor transmitting signal and an optical return module configured to selectively pass or block at least part of the laser beam optical signal; and a fiber cable including an upstream fiber link and a downstream fiber link and configured to establish communications between the local host control device and the remote sensor device, the laser beam optical signal being delivered from the local host control device to the remote sensor device through the downstream fiber link, wherein the optical return module is configured to selectively pass or block the at least part of the laser beam optical signal delivered by the downstream fiber link based on the sensor transmitting signal, to the upstream fiber link, wherein the optical return module comprises an optical valve mechanism configured to selectively pass or block the at least part of the laser beam optical signal to the upstream fiber link, and wherein the optical valve mechanism includes a magnetic coil, a magnetic blocker and a magnetic coil driver configured to control the magnetic coil to selectively pass or block the at least part of the laser beam optical signal to the upstream fiber link by changing a positional relationship between the magnetic blocker and a laser beam path of said at least part of the laser beam optical signal based on a power state of the sensor transmitting signal.

6. An optical fiber link, comprising:

a local host control device including a microcontroller unit configured to transmit a host transmitting signal, and an electrical-to-optical converter configured to convert the host transmitting signal to a laser beam optical signal;

a remote sensor device including a sensor device configured to transmit a sensor transmitting signal and an optical return module configured to selectively pass or block at least part of the laser beam optical signal; and a fiber cable including an upstream fiber link and a downstream fiber link and configured to establish communications between the local host control device and the remote sensor device, the laser beam optical signal being delivered from the local host control device to the remote sensor device through the downstream fiber link, wherein the optical return module is configured to selectively pass or block the at least part of the laser beam optical signal delivered by the downstream fiber link based on the sensor transmitting signal, to the upstream fiber link, wherein the optical return module comprises an optical valve mechanism configured to selectively pass or block the at least part of the laser beam optical signal to the upstream fiber link, and wherein the optical return module further comprises:

an optical splitter configured to split the at least part of the laser beam optical signal into a first optical path leading to the optical valve mechanism and a second optical path leading to an optical combiner; and the optical combiner configured to combine an output of the optical valve mechanism and a laser beam optical signal passing the second optical path, and output the combined laser beam optical signal to the upstream fiber link.

7. The optical fiber link according to claim 6, wherein a laser beam power ratio of a laser beam optical signal passing the first optical path to a laser beam optical signal passing the second optical path is between 9:1 and 5:5.

8. An optical fiber link, comprising:

a local host control device including a microcontroller unit configured to transmit a host transmitting signal, and an electrical-to-optical converter configured to convert the host transmitting signal to a laser beam optical signal;

a remote sensor device including a sensor device configured to transmit a sensor transmitting signal and an optical return module configured to selectively pass or block at least part of the laser beam optical signal; and a fiber cable including an upstream fiber link and a downstream fiber link and configured to establish communications between the local host control device and the remote sensor device, the laser beam optical signal being delivered from the local host control device to the remote sensor device through the downstream fiber link, wherein the optical return module is configured to selectively pass or block the at least part of the laser beam optical signal delivered by the downstream fiber link based on the sensor transmitting signal, to the upstream fiber link, wherein the remote sensor device further comprises an optical splitter configured to split the laser beam optical signal delivered by the downstream fiber link into a first optical path leading to the sensor device, and a second optical path leading to the optical return module, and wherein the remote sensor device further comprises a solar cell configured to absorb and convert a laser beam optical signal delivered by the first optical path into a voltage energy for supplying power to the sensor device.

9. The optical fiber link according to claim 8, wherein a laser beam power ratio of a laser beam optical signal passing the first optical path to a laser beam optical signal passing the second optical path is between 9:1 and 2:8.

10. The optical fiber link according to claim 8, wherein the remote sensor device further comprises a signal detector detecting a voltage change of the voltage energy output from the solar cell and converting the voltage energy output from the solar cell to a sensor receiving signal to be delivered to the sensor device.

11. An optical fiber link, comprising:

a local host control device including a microcontroller unit configured to transmit a host transmitting signal, and an electrical-to-optical converter configured to convert the host transmitting signal to a laser beam optical signal;

a remote sensor device including a sensor device configured to transmit a sensor transmitting signal and an optical return module configured to selectively pass or block at least part of the laser beam optical signal; and a fiber cable including an upstream fiber link and a downstream fiber link and configured to establish communications between the local host control device and the remote sensor device, the laser beam optical signal being delivered from the local host control device to the remote sensor device through the downstream fiber link, wherein the optical return module is configured to selectively pass or block the at least part of the laser beam optical signal delivered by the downstream fiber link based on the sensor transmitting signal, to the upstream fiber link, wherein the remote sensor device further comprises an optical splitter configured to split the laser beam optical signal delivered by the downstream fiber link into a first optical path leading to the sensor device, and a second optical path leading to the optical return module, and wherein the remote sensor device further comprises a solar cell configured to absorb and convert a laser beam optical signal delivered by the first optical path into a voltage energy; and a signal detector receiving the voltage energy from the solar cell, detecting a voltage change of the voltage energy and converting the voltage energy to a sensor receiving signal to be delivered to the sensor device.

12. A method of establishing a communication between a local host control device and a remote sensor device, comprising the steps of:

connecting the local host control device and the remote sensor device with a fiber cable including an upstream fiber link and a downstream fiber link;

transmitting a host transmitting signal from a microcontroller unit of the local host control device;

converting the host transmitting signal to a laser beam optical signal;

transmitting the laser beam optical signal from the local host control device to the remote sensor device through the downstream fiber link;

selectively passing or blocking at least part of the laser beam optical signal delivered by the downstream fiber link, based on a sensor transmitting signal transmitted by a sensor device of the remote sensor device, to the upstream fiber link;

splitting the laser beam optical signal delivered by the downstream fiber link from the local host into a first optical path for supplying power to the sensor device with a solar cell, and a second optical path as said at least part of the laser beam optical signal for delivering to the upstream fiber link; and recovering laser beam optical signal states by detecting a voltage change of a voltage energy output from the solar cell and converting the voltage energy output from the solar cell to a sensor receiving signal to be delivered to the sensor device, wherein a laser beam optical signal delivered to the upstream fiber link is in a high laser beam power state when sensor transmitting signal is in a high voltage level, and is in a low laser beam power state when sensor transmitting signal is in a low voltage level.

13. The method according to claim 12, wherein a laser beam power ratio of a laser beam optical signal passing the first optical path to a laser beam optical signal passing the second optical path is between 9:1 and 2:8.

* * * * *